Figure 1:
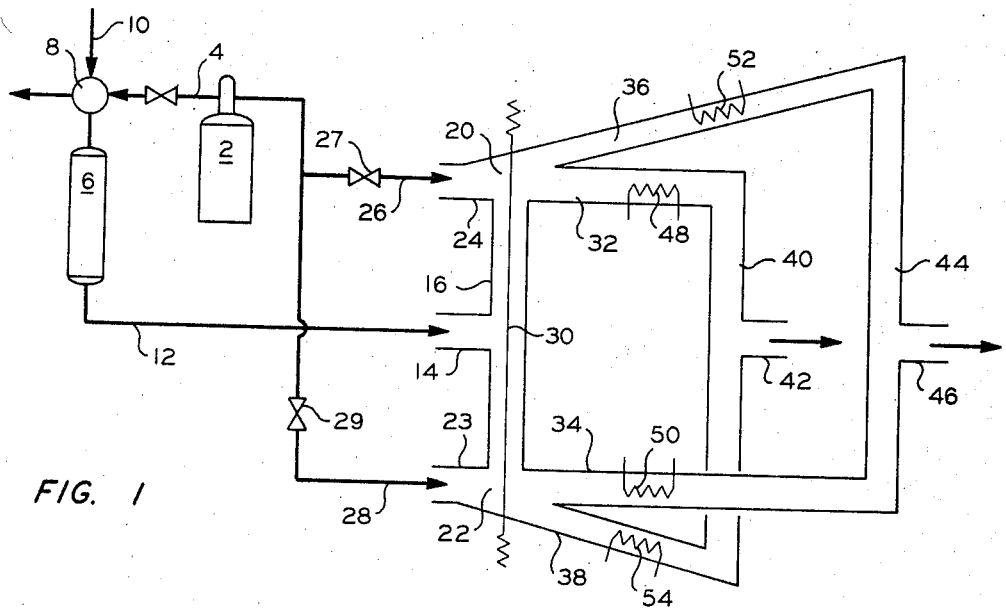

Jan. 28, 1969  R. A. PRIMROSE  3,423,989

DENSITY BALANCE

Filed Dec. 29, 1966

INVENTOR.
R. A. PRIMROSE
BY Young & Quigg
ATTORNEYS

United States Patent Office 3,423,989
Patented Jan. 28, 1969

3,423,989
DENSITY BALANCE
Russell A. Primrose, Rolla, Mo., assignor to Phillips Petroleum Company, a corporation of Delaware
Filed Dec. 29, 1966, Ser. No. 605,776
U.S. Cl. 73—30        10 Claims
Int. Cl. G01n 31/00

This invention relates to a density balance. In one of its aspects it relates to a density balance having improved response time due to the incorporation of a thermal gradient in the sample tube. In another of its aspects the invention relates to a gas density balance in which the sensitivity of the instrument is increased by the use of at least one pneumatic amplifier at an outlet of the sample tube in the density balance.

Gas density balances are well known. For example, Nerheim, 3,117,439, discloses a gas density balance which is proposed for use in a chromatographic column. As Nerheim points out, it is desirable that the gas density balance be fast, accurate and insensitive to flow rates of the carrier gas from the chromatographic analyzer. Due to the fact that the prior art gas density balances rely on a gas density separation for detection, these devices are unsuitable for commercial plant on-stream operation in gas chromatography because the response time is slow due to the fact that the gas density separation is relatively slow.

I have now discovered that the response time of the gas density balance can be greatly increased by the incorporation of a thermal gradient in the sample tube.

Another problem with the gas density balances is that of sensitivity. For relatively small volumes, changes in rate of flow are relatively small. I have now discovered that the sensitivity of the gas density balance can be greatly increased by the use of at least one pneumatic amplifier at the outlet of the sample tube.

By various aspects of this invention, one or more of the following objects can be attained.

It is an object of this invention to provide a gas density balance of increased sensitivity.

It is a further object of this invention to provide a method for detecting the components from a chromatographic analyzer and measuring the densities thereof.

It is a further object of this invention to provide a gas density balance with an improved response time.

It is a still further object of this invention to provide a gas density balance of increased sensitivity and decreased response time.

Other aspects, objects and the several advantages of this invention are apparent to one skilled in the art from a study of this disclosure, the drawings, and the appended claims.

According to the invention, a gas density balance is provided in which there is a sample tube comprising a vertical conduit. Within the vertical conduit there is provided a means for creating a thermal gradient within the vertical conduit. In one embodiment, the thermal gradient extends from the top to the bottom of the vertical conduit. The thermal gradient greatly improves the rate of separation of the heavier components from the lighter components and speeds the movement of the lighter components out of the upper end of the vertical conduit and the heavier components out of the lower end of the vertical conduit.

In another embodiment, the sensitivity of the balance is greatly improved by the use of a pneumatic amplifier at at least one outlet of the vertical conduit.

In a preferred embodiment, pneumatic amplifiers are used at each of the top and bottom outlets of the vertical separation conduit and are connected in push-pull or opposing relationship such that an increased signal in one amplifier causes a decreased signal in the other amplifier.

Figure 3:
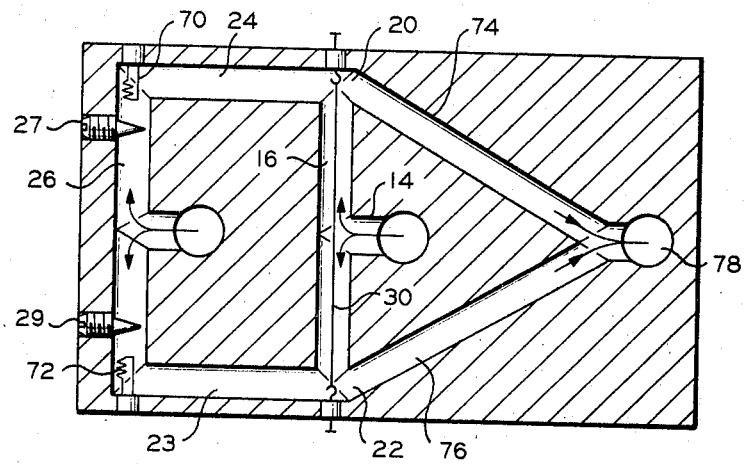
Figure 2:
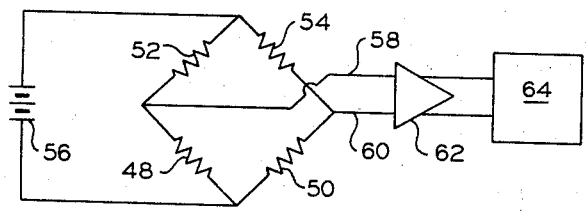

The invention will be exemplified by reference to the accompanying drawings in which FIGURE 1 shows a schematic representation of a gas density balance incorporating the features of the invention; FIGURE 2 is a diagrammatic sketch of an electrical circuit which can be used in the detection means in the gas density balance shown in FIGURE 1; and FIGURE 3 is a schematic representation of another embodiment of the invention.

Referring now to the drawings, a source of carrier gas 2 supplies carrier gas through line 4 to sampling valve 8 which periodically takes sample from a sample stream 10 and passes the same to a chromatographic column 6, the effluent of which passes through line 12 into inlet 14 of the gas density balance. The carrier gas and separated sample enters the sample zone which comprises vertical conduit 16. The lighter components are separated from the heavier components in vertical conduit 16. In the event that the carrier gas is lighter than the sample component, the sample component will separate from the carrier gas and will gravitate to outlet 22 at the bottom of vertical conduit 16. On the other hand, the carrier gas will rise and be emitted through outlet 20. If the sample component is lighter than the carrier gas, the carrier gas will pass through outlet 22 and the lighter component will pass through outlet 20. At outlets 20 and 22 power gas is supplied through lines 26 and 28 to horizontal conduits 23 and 24. The flow of power gas through horizontal conduits 23 and 24 is in balance when no sample is flowing through line 14. The flow can be balanced by adjusting valves 27 and 29. Most of the power gas passing through horizontal conduit 24 will pass through horizontal conduit 32, conduit 40 and be removed through outlet 42. Similarly, power gas passing through horizontal conduit 23 will pass into horizontal conduit 34 which is opposite conduit 23 and be removed from the balance through conduit 44 and outlet 46. The power gas which is used can be the same as the carrier gas or can be different gases. For example, the carrier gas can be nitrogen, helium, hydrogen, or argon and the power gas can be any one of the aforementioned gases or can be air.

In accordance with one embodiment of the invention, a heated wire 30 is provided in vertical conduit 16. The heated wire 30 which can be externally controlled to provide a thermal gradient within the conduit 16 from the wire to the outside. As is understood by one skilled in the art, the thermal gradient causes the lighter components in the gas to move toward wire 30 and the heavier components to diffuse to the outer portion of conduit 16. In this manner, a faster separation of the components is effected and the separated components can thus more rapidly pass out of vertical conduit 16 thereby giving the gas balance a faster response time.

In accordance with another embodiment of the invention, the sensitivity of the gas balance is greatly improved by the use of a pneumatic amplifier at the outlet of the top and/or bottom of vertical conduit 16. With reference to FIGURE 1, conduit 36 is connected at outlet 20 and is positioned at an acute angle to horizontal conduit 32. The outlet from conduit 36 passes into channel 44 and is removed through outlet 46. At the lower end of vertical conduit 16 there is provided conduit 38 which is attached to outlet 22 and at its other end to conduit 40 and outlet 42. Conduit 38 is positioned at an acute angle to horizontal conduit 34. Whereas conduit 38 and conduit 36 have been shown to be positioned downwardly and upwardly respectively with respect to horizontal conduits 34 and 32 respectively, it is within the scope of the invention to position these conduits other than as shown in the drawing so long as the acute angle between the horizontal conduits is maintained. For example, conduit 36 could be horizontal or extend downwardly with respect to conduit 32 so long as there is an acute angle between conduit 36 and conduit 32. Similarly, conduit 38 could extend upwardly or horizontal with respect to conduit 34 so long as the acute angle between the two is maintained. Thermoelectric detection means 52 and 54 are positioned in conduits 36 and 38 respectively to detect the flow of fluid in those conduits. The thermoelectric detectors can be positive or negative reacting thermistors, or simple electrical resistors. For maximum sensitivity, ionization detectors or thermistor elements are desired. Additionally, thermoelectric elements 48 and 50 are positioned in conduits 32 and 34 respectively to reference the signals detected in conduits 36 and 38 as will be hereinafter described.

With reference now to FIGURE 2, thermoelectric elements 48, 50, 52, and 54 are connected in a balance circuit to which power is supplied by battery 56. The output from the balance circuit is removed through leads 58 and 60 and passed to amplifier 62 and to recorder 64.

In operation, a sample and carrier gas are eluted from column 6 and pass through line 12 and in through inlet 14. Carrier gas or power gas is passed through horizontal conduits 24 and 23. Most of the power gas in line 24 passes through line 32 and out through outlet 42. A portion of the power gas in line 24 is deflected through conduit 36 and passes through conduit 44 and out through 46. Similarly, the power gas passing through horizontal conduit 23 for the most part passes through conduit 34, conduit 44 and out through 46. A portion of the power gas passes through conduit 38, conduit 40 and out through outlet 42. If the sample entering the vertical conduit 16 is heavier than the carrier gas, a rapid separation will be effected by the hot wire 30. The heavier component begins to move by gravity and also due to the thermal gradient effect downwardly in vertical conduit 16. This causes a downward pressure at outlet 22 which deflects more of the power gas into conduit 38. At the same time, a small amount of power gas is drawn down into vertical conduit 16 thereby causing less power gas to go through conduit 36. Thus, the increase in flow through conduit 38 will cause a decrease in the temperature of resistor 54 and a decrease in the resistance of element 54. Conversely, less power gas passing through line 36 will cause an increase in the temperature and thus the resistance of resistor 52. In the balance circuit shown in FIGURE 2, a decrease in the resistance 54 and an increase in the resistance 52 will have opposite or push-pull effects such that both conditions tend to increase the flow of current through resistor 54, lead 60, through the amplifier 12, and recorder 62, and then back through lead 58 to the opposite side of the balance circuit.

As is understood by one skilled in the art, the arrangement of the various resistance elements in the balance circuit can be changed without changing the effect. For example, resistance elements 50 and 52 could be interchanged without changing the operation of the balance circuit.

In the embodiment illustrated in FIGURE 1, it is desirable to connect the outlet from horizontal conduit 32 to the outlet from conduit 38 and the outlet from horizontal conduit 34 to the outlet to conduit 36. In this manner, no back pressure on the horizontal conduits builds up and a maximum amount of fluid can flow through the horizontal conduits thereby giving maximum amplification effect to the fluid which is deflected into or out of the conduits 38 and 36.

Referring now to FIGURE 3, where like numerals are used to designate like parts, the adjusting means in lines 26 and 28 are shown as variable resistance setscrews 27 and 29. In this embodiment, the outlets from vertical conduit 16 are connected to conduits 74 and 76 which have a common exit 78. In this embodiment, thermoelectric detectors 70 and 72 are positioned in horizontal conduits 23 and 24. In operation, the power gas is passed equally through conduits 23 and 24 by adjusting setscrews 27 and 29. When a sample is passed into separation conduit 16 through inlet 14 a rapid separation of the sample components of the carrier gas will be effected by hot wire 30. In the event that the component is heavier than the carrier gas, the component will diffuse rapidly to the outer portion of the vertical conduit 16 and will begin to gravitate downwardly. The downward pressure causes a decrease in the flow of power gas through horizontal conduit 23 thereby causing an increase in the resistance in thermoelectric detector 72. At the same time, an increase in the flow of power gas past thermoelectric detector 70 in horizontal conduit 24 will occur. This causes a decrease in resistance 70. Detectors 70 and 72 can be positioned in a balance circuit such as FIGURE 2 and thus the relative density of the sample components can be readily detected.

Reasonable variation and modification are possible within the scope of the foregoing disclosure, the drawing, and the appended claims without departing from the spirit of the invention.

I claim:
1. A density balance comprising
a vertical conduit,
means in the central portion of said vertical conduit to pass a fluid to be measured into said vertical conduit,
outlet means at the top and bottom of said vertical conduit,
first horizontal conduit connected to an outlet at the upper end of said vertical conduit to supply fluid pressure at about 90° to said upper outlet means of said vertical conduit,
second horizontal conduit connected to a bottom outlet means of said vertical conduit to supply fluid pressure at about 90° to said lower outlet of said vertical conduit,
means to supply fluid at equal pressures to each of said first and second horizontal conduits at a time when no sample is in said vertical conduit,
detection means to sense a change in the flow of fluid in said top and bottom outlet means, said detection means comprising
at least one pneumatic amplifier at the outlet of at least one of said top and bottom outlet means,
and means to detect changes in the flow of fluid through said one pneumatic amplifier.

2. A density balance according to claim 1 wherein there is provided a first and second pneumatic amplifier, said first pneumatic amplifier positioned at said upper outlet means of said vertical conduit and said second pneumatic amplifier positioned at said bottom outlet means of said vertical conduit, said first pneumatic amplifier comprising a third horizontal conduit and a fourth conduit, both connected to the junction of said first horizontal conduit with said upper outlet means of said vertical conduit, said fourth conduit positioned at an acute angle to said third conduit,
said second pneumatic amplifier comprising a fifth horizontal conduit and a sixth conduit, both connected to the junction of said second horizontal conduit with said lower outlet of said vertical conduit, said fifth conduit means positioned at an acute angle to said fourth conduit means.

3. A density balance according to claim 2 wherein there is provided a first thermal detector means in said third conduit, a second thermal detector means in said fourth conduit, a third thermal resistor detector means in said fifth conduit and a fourth thermal resistor detector in said sixth conduit, said first, second, third and fourth thermal resistor detector means being connected in a balance circuit such that an increase in the resistance of said second thermal resistor detector and a decrease in the resistance of said fourth thermal resistor detector will give the same quality of response from the output from said balance circuit.

4. A density balance according to claim 3 wherein the outlet from said fourth conduit is connected to the outlet from said fifth conduit and the outlet from said sixth conduit is connected to the outlet from said third conduit.

5. A density balance according to claim 1 wherein there is provided in said vertical conduit a means to establish a thermal gradient throughout the cross-section of said vertical conduit to increase the tendency of heavy components to separate from light components and pass into the lower portion of said vertical conduit and the tendency of said lighter components to flow upwardly in said first vertical conduit.

6. A gas balance according to claim 5 wherein said means to establish a thermal gradient comprises a heated wire extending throughout the entire length of said first vertical conduit.

7. A density balance comprising
a vertical conduit,
means in the central portion of said vertical conduit to pass a fluid to be measured into said conduit,
outlet means at the top and bottom of said vertical conduit,
first horizontal conduit connected to an outlet at the upper end of said vertical conduit to supply fluid pressure at about 90° to said outlet of said first vertical conduit,
second horizontal conduit connected to a bottom outlet means of said first vertical conduit to supply fluid pressure at about 90° to said lower outlet of said first vertical conduit,
means to supply fluid at equal pressures to each of said first and second horizontal conduits when no sample is present in said vertical conduit,
detection means to sense a change in the flow of fluid in said top and bottom outlet of said vertical conduit, and
means in said first vertical conduit to establish a thermal gradient throughout the cross-section of said first vertical conduit to increase the tendency of heavy components to separate from lighter components and pass to the lower portion of said vertical conduit and to increase the tendency of said lighter components to flow upwardly in said vertical conduit.

8. In a method of measuring the mass density of a fluid component in a mass balance comprising a vertical separation zone into which components are passed wherein fluids rising in said separation zone are passed to an upper outlet zone, fluids gravitating in said separation zone are passed to a lower outlet zone, and the flow of fluid in said upper zone and said lower zone is detected to determine the density of said fluid entering said separation zone, the improvement which comprises subjecting said components in said separation zone to a thermal gradient across the cross section of said separation zone for improving the rate of separation of lighter components from heavier components and thereby increasing the speed at which lighter fluids move to said upper outlet zone and the speed at which heavier components move to said lower outlet zone.

9. A method according to claim 8 wherein said thermal gradient is applied across the entire cross section of said separation zone.

10. A method according to claim 8 which further includes pneumatically amplifying the flow of fluids flowing into at least one of said upper and lower outlet zones.

References Cited

UNITED STATES PATENTS 3,124,953  3/1964  Nerheim et al. _____ 73—30

RICHARD C. QUEISSER, *Primary Examiner.*

VICTOR J. TOTH, *Assistant Examiner.*